United States Patent Office 3,479,585
Patented Nov. 18, 1969

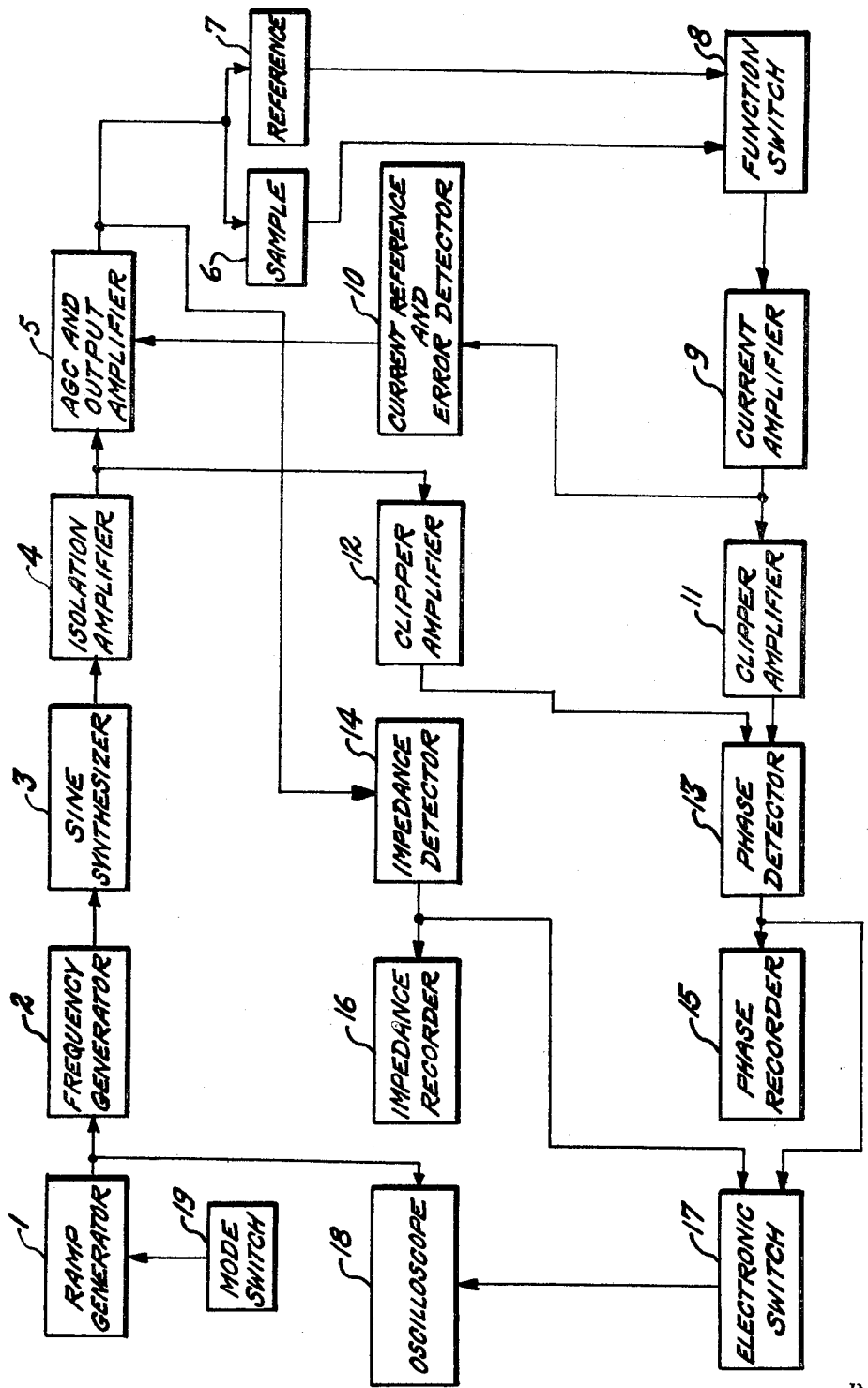

3,479,585
SYSTEM FOR MEASURING THE IMPEDANCE AND PHASE OF A SOLID PROPELLANT INCLUDING A CONSTANT CURRENT SOURCE
Bruce W. Liebel, Chino, and Howard C. Edgington and Philip J. Meredith, Covina, Calif., assignors to the United States of America as represented by the Secretary of the Air Force
Filed Aug. 2, 1967, Ser. No. 658,313
Int. Cl. G01r 27/00; H03k 5/08
U.S. Cl. 324—57
3 Claims

ABSTRACT OF THE DISCLOSURE

A system for the non-destructive testing of a solid propellant sample by sweeping the sample with a precisely controlled sinusoidal voltage of varying frequency and amplitude. The system includes feedback means to regulate the amplitude of the signal to the sample so as to maintain a constant current therethrough. This current is compared to a reference thus generating an error signal for application to the feedback means with the error signal being a measure of the impedance. Phase means are provided to compare the error signal to the sinusoidal voltage for phase measurement.

---

This invention relates to the non-destructive testing of a solid propellant sample and more particularly a low voltage electronic system which determines and records the impedance and phase angle parameters of the solid propellant thereby providing information as to the chemical and physiochemical condition thereof.

The use of solid propellants in the rocket and missile field is widespread and particularly in the field of rocket assisted projectiles and boosters. In order to be able to accurately predict the performance of such devices it is necessary to know the chemical and physiochemical condition of the solid propellant included therein.

The primary purpose of the system of the present invention is to measure and record the impedance and phase angle parameters of a solid propellant sample when excited by a sinusoidal voltage of varying frequency. By obtaining these parameters as a function of frequency (frequency response), information can be derived non-destructively on the sample as to its chemical and physiochemical condition.

The system of the present invention was designed to measure the frequency response parameters of a solid propellant sample. However, within the operating limits of this system, it may be used to measure the dielectric properties of various plastics and other non-conductive materials, measure the effect of moisture and temperature on various dielectric materials, measure the frequency response of passive electronic networks used in control systems, and analog computer systems.

An object of the present invention is to provide a system to measure and record the impedance and phase angle parameters of a solid propellant sample.

Another object of the present invention is to provide a system for the non-destructive testing of a solid propellant sample by applying a sinusoidal voltage of varying frequency to the sample and deriving impedance and phase angle parameters therefrom.

The various features of novelty which characterize this invention are pointed out with particularity in the claims annexed to and forming a part of this specification. For a better understanding of this invention, however, its advantages and specific objects obtained with its use, reference should be had to the accompanying drawing and descriptive matter in which is illustrated and described a preferred embodiment of the invention.

Referring now to the drawing, there is shown conventional ramp generator 1 whose output is fed simultaneously to frequency generator 2 and oscilloscope 18. Ramp generator 1 provides a voltage proportional to time to frequency generator 2 to provide a frequency sweep from 1 Hz. to 10 kHz. Ramp generator 1 can be operated in three modes, as selected by mode switch 19: recurrent, single sweep, and manual. Frequency generator 2 is a voltage-controlled, wide-range, constant-amplitude frequency generator which may consist of a bistable multivibrator, variable gain amplifier, and integrator to form a closed-loop, constant-amplitude, triangular-wave generator. However, it is to be noted that any conventional generator can be utilized which provides constant-amplitude, triangular wave generation.

The triangular wave from frequency generator 2 is fed to sine synthesizer 3 for shaping into a sine wave. Sine synthesizer 2 may be the conventional type of diode function generator.

Isolation amplifier 4 interconnects sine synthesizer 3 and conventional automatic gain control (AGC) and output amplifier 5. Isolation amplifier 4 is provided to obtain the correct output impedance from sine synthesizer 3 and the correct signal level to automatic gain control amplifier and output amplifier 5.

AGC amplifier and output amplifier 5 regulates the amplitude of the signal to solid propellant sample 6 so as to maintain a constant current through sample 6. This current is fed by way of function switch 8 to amplifier 9. The output of amplifier 9 is fed simultaneously to current reference and error detector 10 and clipper amplifier 11. Current reference and error detector 10 includes any conventional reference source which is fed therein to a conventional comparison circuit. The comparison circuit also receives amplifier 9 output. The output of error detector 10 is fed to AGC amplifier 5 for control thereof. If there is a difference signal from current reference end error detector 10, this represents an error signal. The voltage that is applied to sample 6 is then proportional to the impedance of sample 6. This voltage is also applied from the output of AGC amplifier and output amplifier 5 to impedance detector 14. The output of impedance detector 14 is displayed on impedance recorder 16. Recorder 16 may be any conventional recorder which records an applied D.C. signal which recorded and displayed voltage is proportional to the impedance of solid propellant 6.

The output from current amplifier 9 and the output from AGC and output amplifier 5 are fed through clipper amplifiers 11 and 12, respectively, to phase detector 13 as input signals. Phase detector 13 is the conventional type of phase discriminator which compares the phase relationship of the two signal inputs and puts out a voltage proportional to the phase difference. This phase signal is then fed to phase recorder 15 which also displays the input signal thereto. Recorder 15 may be of the same conventional type as recorder 16.

Electronic switch 17 receives input signals, the outputs of phase detector 13 and impedance detector 14. Electronic switch is used to present simultaneously the impedance and phase signal to oscilloscope 18. This allows photographs to be made of both traces. It is to be noted that the output of ramp generator 1 is also fed to oscilloscope 18 for synchronization.

Function switch 8 is used to insert stable reference network 7 in place of solid propellant sample 6 for checking the system.

What is claimed is:
1. A non-destructive testing system for measuring and recording the impedance and phase parameters of a solid propellant sample comprising a ramp generator providing a voltage proportional to time, a frequency generator receiving the output of said ramp generator and being voltage-controlled, wide-range, and providing a triangular wave output, a sine synthesizer receiving said triangular wave output for shaping into a corresponding sine wave signal, an automatic gain control amplifier, an isolation amplifier interconnecting said frequency generating means and said automatic gain control amplifier to provide predetermined impedance matching and also a predetermined signal level input to said automatic gain control amplifier, a solid propellant sample receiving the output signal from said automatic gain control amplifier with said automatic gain control amplifier operating to maintain a constant current through said solid propellant sample, stable second reference means to be substituted for said solid propellant sample for checking purposes, said second stable reference means also receiving said output signal from said automatic gain control amplifier, a predetermined current first reference source, first switch means receiving simultaneously the output from said solid propellant sample and said stable second reference means, said first switch means operating to provide selectively said output from solid propellant sample or the output from said stable second reference means, a comparison circuit receiving as a pair of inputs the output from said current first reference source and the output from said first switch means, the signal output from said comparison circuit operating as an error signal and applied to said automatic gain control amplifier as a control signal thus providing a signal to said solid propellant sample that is proportional to the impedance of said sample, a detector receiving the output signal of said automatic gain control amplifier and operating as an impedance detector, a recorder for displaying the output of said detector, said display being representative of the impedance of said sample, a phase detector simultaneously receiving an output from said first switch means and an output from said isolation amplifier, and means to record and display the output of said phase detector, said output being representative of said phase parameter.

2. A non-destructive system as defined in claim 1 further including second switch means simultaneously receiving the output from said phase detector and the output from said impedance detector, said second switch operating to provide an alternate output, and an oscilloscope receiving said alternate output for visual display purposes, said oscilloscope simultaneously receiving a synchronizing signal from the output of said ramp generator.

3. A non-destructive system as defined in claim 2 further including switch means to operate selectively the mode of said ramp generator recurrently, single sweep, and normally.

References Cited
UNITED STATES PATENTS

| | | | |
|---|---|---|---|
| 2,548,276 | 4/1951 | Weisbecker | 324—57 X |
| 2,668,943 | 2/1954 | Wilson | 324—57 |
| 3,026,474 | 3/1962 | Pihl | 324—60 |
| 3,243,699 | 2/1966 | Kummer | 324—57 |
| 3,230,449 | 1/1966 | Kaiser | 324—60 |
| 3,283,242 | 11/1966 | Oliver | 324—57 |
| 3,293,546 | 12/1966 | Calvert et al. | 324—57 |
| 3,387,776 | 6/1968 | Stillwell et al. | 324—61 |
| 3,388,326 | 6/1968 | Brooks | 324—57 |

EDWARD E. KUBASIEWICZ, Primary Examiner

U.S. Cl. X.R.

328—27